Feb. 11, 1969     T. SMITH     3,426,584
SURFACE TENSION MEASURING INSTRUMENT
Filed March 24, 1967     Sheet 2 of 2

INVENTOR.
TENNYSON SMITH

BY

ATTORNEY

United States Patent Office 3,426,584
Patented Feb. 11, 1969

3,426,584
SURFACE TENSION MEASURING INSTRUMENT
Tennyson Smith, Thousand Oaks, Calif., assignor to North American Rockwell Corporation, a corporation of Delaware
Filed Mar. 24, 1967, Ser. No. 625,704
U.S. Cl. 73—64.4      6 Claims
Int. Cl. G01n 11/00

ABSTRACT OF THE DISCLOSURE

An instrument for measuring the surface tension of a liquid is disclosed which utilizes a pair of tubes submerged in the liquid through which a gas is bubbled. The tubes have submerged openings of different radii and penetrate the liquid to different depths. The difference in pressure is measured between the flow in the tubes and a signal generated which is proportional to the surface tension of the liquid.

Background

While there are a number of methods for measuring the surface tension of a liquid the bubble pressure method is most accurate since it is independent of the size of the boundary angle, an important advantage over the rising height method. It is also preferred to the dropping weight method since that method is relative only and can not be utilized for absolute measurements as the bubble pressure method. However, the bubble pressure method usually requires a skilled technician in order for reasonably accurate surface tension measurements to be obtained. Even then the measurements are difficult and slow. As a result great amounts of time are generally required to obtain a sufficiently large number of measurements so that averaging techniques can be applied and reliable, accurate surface tension measurements obtained.

Summary of invention

The present invention is directed to a surface tension measuring instrument utilizing a pair of tubes connected to a gas source, inserted into the liquid to be tested, to different depths, and having gas escape apertures of different sizes, such that the differences in the depths is equal to two-thirds the differences in the aperture radii. The gas is allowed to flow alternately through each tube and the pressure measured. A signal for each of these pressure values is generated and the difference taken which is a function of the surface tension of the liquid through which the gas is bubbled. Therefore, by calibrating the span of an appropriate recorder the absolute value of the surface tension of the liquid can be recorded directly.

Description of preferred embodiment

Figure 1:
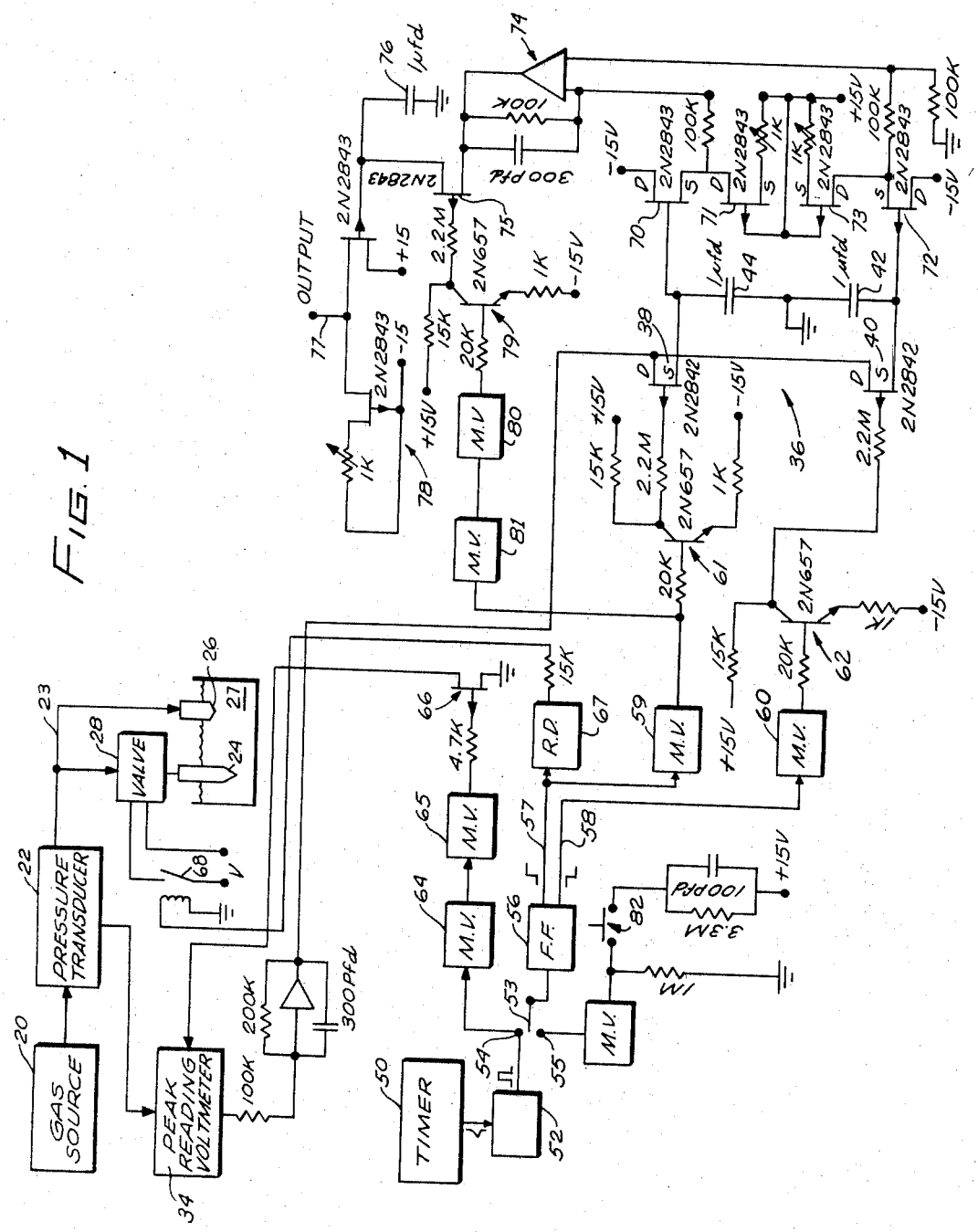
FIG. 1 is a partially schematic circuit diagram of the preferred embodiment of the present invention.

FIG. 1 shows the preferred embodiment of the present invention which comprises a source of inert gas 20 connected through a pressure transducer 22 to a double branch gas system 23 having a pair of bubble tubes 24 and 26. The tubes 24 and 26 have apertures in their ends so that the incoming gas will bubble up through the liquid sample 27, the surface tension of which is to be measured. One tube has an aperture with a radius $r_1$ which is smaller than the radius $r_2$ of the aperture of the other tube. The two tubes are inserted into the liquid sample 27 to different depths such that the tube with radius $r_1$ is at a depth $t_1$ and the tube with radius $r_2$ is at a depth $t_2$. The radii and depths are chosen so that $$t_1 - t_2 = \tfrac{2}{3}(r_2 - r_1)$$

One of branches 23 leading to tube 24 has a solenoid operated valve 28 which is sequentially opened and closed so that the gas will pass only through the large aperture of tube 24 when the valve 28 is open and only through the small aperture of tube 26 when the valve 28 is closed. As a result of the sequential operation the pressure transducer 22 generates a voltage level signal having superimposed variations resulting from the bubble release from the tube 26 when the valve 28 is closed. When valve 28 is opened all of the gas is released through the large aperture of tube 24 so that the pressure is less and the voltage signal of the pressure transducers is smaller. The signal output of pressure transducer 22 is shown diagrammatically in FIG. 3 where the oscillating portion of the curve 30 results from the release of bubbles through the small aperture of tube 26 and the lower oscillating portion of the curve 32 results from the release of bubbles through the large aperture of tube 24.

The signal output from pressure transducer 22 is connected to a peak reading voltmeter 34. The voltmeter 34 generates a voltage signal representing the highest peak of the oscillations on both portions 30 and 32 of the curve of FIG. 3. These signals are connected to a difference taking circuit, indicated generally at 36, comprising a pair of field effect transistors 38 and 40. The output of the peak voltmeter is connected to the drain of each field effect transistor 38 and 40 with the source connected to one side of each of the voltage storing capacitors 42 and 44. The gate connections for transistors 38 and 40 are connected to the timing control circuit.

The timing control circuit comprises a timer 50 connected through a wave shaping circuit 52 to a switch 53 which has automatic and manual contacts 54 and 55. When switch 53 and contact 54 are connected the timing pulse input to flip flop 56 results in complementary voltage level shifts being generated on leads 57 and 58. These voltage level shifts are connected to one shot multivibrators 59 and 60, which generate a pulse of predetermined duration in response to the positive going portion of the voltage level shifts on 57 and 58. These pulses drive transistors 61 and 62. The driving transistors 61 and 62 have their outputs connected to the gates of the field effect transistors 38 and 40, respectively. In this manner a first timing pulse will result in transistor 38 being opened to pass the peak voltage reading from voltmeter 34 to storage capacitor 44 while transistor 40 will be closed. The succeeding timing control pulse, e.g., 10 seconds later, will result in transistor 40 being opened to connect the voltmeter 34 to storage capacitor 42, the transistor 38 being closed upon the termination of the preceding timing pulse.

The shaped timing pulses from circuit 52 are also connected through a pair of one shot multivibrators 64 and 65, functioning as a delay circuit, to the gate of a field effect transistor 66. In this manner each timing pulse results in a positive voltage being applied to the gate of transistor 66 so that the peak reading voltmeter 34 is momentarily connected to ground to be reset. At the same time the condition of transistors 38 and 40 are changed and relay driver 67 closes contact 68 so that the condition of valve 28 is changed. Thus, the position of valve 28, the peak reading voltmeter and the difference measuring circuit are synchronized in response to a pulse from timer 50.

The storage capacitors 42 and 44 have one side connected to ground and their inputs connected to the gates of transistors 70 and 72. These field effect transistors, together with transistors 71 and 73, are connected in such a manner as to present a high impedance to capacitors 42 and 44. The charges on the capacitors 42 and 44 are read as a voltage on the output of transistors 70–71 and 72–73 and these voltages are compared by comparing circuit 74 which generates an output representing the difference between the highest peak on portion 30 and the highest peak of portion 32 of the curve of FIG. 3.

Since only the difference between the higher voltage value 30 and lower voltage value 32, and not the reverse, is desired, a switch transistor 75 is utilized to allow the output of comparing circuit 74 to be periodically stored on a capacitor 76. This value is then reflected at the output 77 through the high impedance circuit 78. The gate of transistor 75 is connected to a driver circuit 79 which has its input connected through a delay circuit composed of a pair of one shot multivibrators 80 and 81 to the output of multivibrator 59. Since multivibrator 59 is responsive to every other timing pulse through flip flop 56, the transistor 75 will be opened only when a signal representing the difference between the peak voltage during curve portion 30 and a subsequent peak voltage during curve portion 32 (see FIG. 3) is generated by the comparing circuit 74.

When switch 53 is connected to the manual operation contact 55, the switch 82 may be used to energize flip flop 56 thereby presenting at the output 77 the voltage difference at the time the contact 82 is closed.

Figure 3:
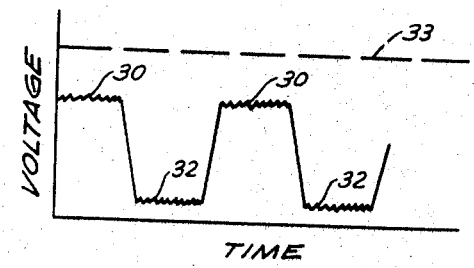
FIG. 3 shows the voltage-time relationship for the output of the transducer 22 of FIG. 1.

The output 77 may be connected directly to a recorder. FIG. 3 shows at curve 33 the output signal for the difference between the peak voltage for bubbles for each tube. This value of the pressure differential is recorded and is proportional to the surface tension in accordance with the following equation:

$$\alpha = \frac{g \Delta P}{2(1/r_1 - 1/r_2)} + \frac{(r_2-r_1)\frac{2}{3} - (t_1-t_2)\frac{1}{2}}{1/r_1 - 1/r_2} + \frac{(r_2^3 - r_1^3)\rho^2}{24\alpha(1/r_1 - 1/r_2)} \quad (1)$$

where:

$\alpha$ is surface tension
$\rho$ is the density of the liquid
$\Delta P$ is the difference in maximum bubble pressure
$r_1$ is the radius of the small aperture
$r_2$ is the radius of the large aperture,
$t_1 - t_2$ is the difference in depth,
$g$ is the gravitational constant Since, as noted above, $t_1-t_2$ has been set equal to $\frac{2}{3}(r_2-r_1)$, the second term of the equation is zero. Further, the third term is essentially negligible for all cases if $r_2$ is less than 0.2 cm. and $r_1$ is less than 0.01 cm. Thus, the surface tension can be expressed as the product of a constant, determined by the radii of the apertures, and the pressure differential.

Figure 2:
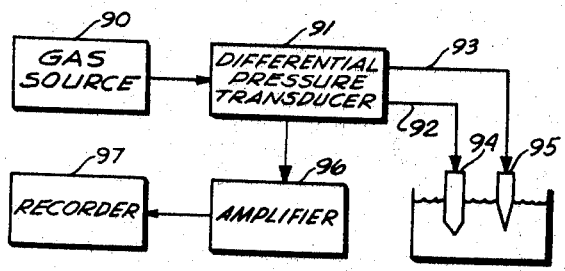
FIG. 2 is a schematic diagram of another embodiment of the present invention.

FIG. 2 shows a schematic diagram of another embodiment of the present invention. The preferred embodiment of FIG. 1 provides surface tension measurements with an accuracy of about 0.1 percent. The embodiment of FIG. 2 is considerably simpler and provides surface tension measurements with considerably less accuracy, i.e., about two percent. However, where such a lower accuracy can be tolerated the system of FIG. 2 may be utilized. This embodiment comprises a source of inert gas 90 connected through a differential pressure transducer 91 which measures the difference in pressure between gas lines 92 and 93. The gas lines are connected to a pair of bubble tubes 91 and 95 having the same aperture radius and depth of penetration into the liquid sample as described above with respect to FIG. 1. The differential pressure transducer 91 may be a standard commercial circuit, such as the "Baratron Pressure Meter" manufactured by the MKS Instrument Co. The output of the differential pressure transducer 91 is connected through amplifier 96 to a standard recorder 97.

Figure 4:
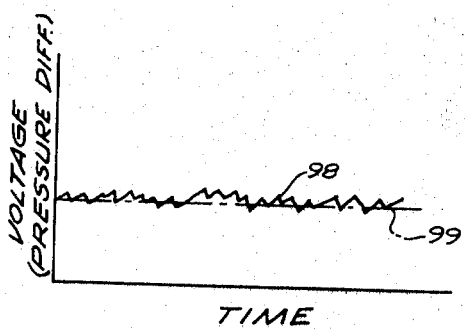
FIG. 4 shows the voltage-time relationship for the output of the differential presence transducer 91 of FIG. 2.

In the embodiment of FIG. 2 the gas is simultaneously bubbled through the apertures of tubes 94 and 95 at the rate of one bubble per second. The rate is not critical so long as a gas jet is not formed. The transducer 91 generates an electrical signal as shown by curve 98 in FIG. 4. The average value of these oscillations is obtained with a resultant smooth curve 99 which is proportional to the surface tension, by using an amplifier with a sufficiently long time constant. The reason this embodiment is not as accurate as the preferred embodiment of FIG. 1 is that the average value of the difference between the pressure generated in tubes 94 and 95 is not necessarily equal to the difference between the maximum pressures as required by Equation 1 above.

It is clear that the embodiment of FIG. 2 will provide a less accurate surface tension measurement since the oscillations, resulting from the bubbling, will be directly reflected in the calculated results for surface tension.

I claim:

1. A method of measuring the surface tension of a liquid comprising the step of injecting a gas through a first aperture and at a first depth into a liquid, injecting a gas through a second aperture and at a second depth into said liquid, the difference between said insertion depths being two thirds the difference between the radii of said apertures, and measuring the difference in gas pressure between said tubes, said pressure differential being proportional to the surface tension of said liquid.

2. An apparatus for measuring the surface tension of a liquid comprising a pair of gas injecting tubes adapted to be inserted in said liquid to different predetermined depths, each of said tubes having a gas escape opening at the lower end thereof, said openings being of different sizes, means for applying a gas pressure to said tubes in a controlled manner so that gas will be forced through said openings, and means operatively associated with both said tubes and responsive to the difference in pressure in said tubes for generating a signal which is a function of the surface tension of the liquid through which the gas is bubbled, and means responsive to said signal for recording said signal.

3. An apparatus for measuring the surface tension of a liquid sample comprising a source of gas, a pair of tubes inserted into said sample to be tested to different depths and having gas escape apertures of different sizes, the difference between said depths being equal to two thirds of the difference between the radii of said aperture, means alternately connecting said source to each of said tubes, said connecting means including means for generating an electrical signal proportional to the pressure differential on said tubes.

4. The apparatus of claim 3 wherein said last named means includes a pressure transducer responsive to the pressure in said tubes to generate a signal, said means for alternately connecting said source including a valve associated with one of said tubes, timer means for periodically energizing said valve means, means responsive to said transducer signal for generating a first voltage signal when said valve means is energized and a second voltage signal when said valve means is deenergized, and means for taking the difference between said first and second voltage signals, said difference being proportional to the surface tension of said liquid sample.

5. The apparatus of claim 4 wherein means responsive to said transducer signal includes a peak reading voltmeter.

6. The apparatus of claim 5 wherein said valve means, peak reading voltmeter and said difference taking means are synchronized in response to said timer means.

References Cited

UNITED STATES PATENTS

| | | | |
|---|---|---|---|
| 2,577,548 | 12/1951 | Vetter | 73—439 |
| 2,755,669 | 7/1956 | Beard | 73—439 |
| 2,898,763 | 8/1959 | Jawett | 73—439 |
| 3,276,844 | 10/1966 | Davison et al. | 73—64.4 X |
| 3,380,463 | 4/1968 | Trethewey | 73—302 |

FOREIGN PATENTS

| | | |
|---|---|---|
| 1,167,066 | 5/1961 | Germany. |

LOUIS R. PRINCE, *Primary Examiner.*

J. W. ROSKOS, *Assistant Examiner.*

U.S. Cl. X.R.

73—439